(12) United States Patent
Gilbert

(10) Patent No.: US 12,364,246 B2
(45) Date of Patent: Jul. 22, 2025

(54) COLLAPSIBLE CONTAINMENT SYSTEM

(71) Applicant: ReptileBreeders, Cape Coral, FL (US)

(72) Inventor: Liam Gilbert, Cape Coral, FL (US)

(73) Assignee: ReptileBreeders, Cape Coral, FL (US)

( * ) Notice: Subject to any disclaimer, the term of this patent is extended or adjusted under 35 U.S.C. 154(b) by 18 days.

(21) Appl. No.: 18/502,822

(22) Filed: Nov. 6, 2023

(65) Prior Publication Data

US 2025/0143255 A1      May 8, 2025

(51) Int. Cl.
```
A01K 1/03      (2006.01)
A47B 43/00     (2006.01)
A47F 5/10      (2006.01)
A47B 87/02     (2006.01)
A47F 3/14      (2006.01)
A47F 5/00      (2006.01)
```
(52) U.S. Cl.
CPC ............... *A01K 1/03* (2013.01); *A47B 43/00* (2013.01); *A47F 5/10* (2013.01); *A47B 87/02* (2013.01); *A47F 3/14* (2013.01); *A47F 5/0025* (2013.01)

(58) Field of Classification Search
CPC .......... A01K 1/03; A47B 43/00; A47B 45/00; A47B 87/02; A47B 87/0207; A47B 87/0261; A47F 5/10; A47F 5/13; A47F 3/14; A47F 5/0025; B42F 7/10; B42F 7/12; A47K 3/004
USPC .................................. 211/195, 194, 200–202
See application file for complete search history.

(56) References Cited

U.S. PATENT DOCUMENTS

| | | | | |
|---|---|---|---|---|
| 4,759,451 A | * | 7/1988 | Apps .................... | B65D 21/041 206/505 |
| 9,668,600 B1 | * | 6/2017 | Lau ......................... | A47J 47/14 |

* cited by examiner

*Primary Examiner* — Devin K Barnett
(74) *Attorney, Agent, or Firm* — Larson & Larson, P.A.; Frank Liebenow

(57) ABSTRACT

An animal containment system includes a frame and a set of animal beds (e.g., plastic bins or similar) that are held in the frame for growing, mating, demonstration, sales, etc. When the animals are no longer present, the frame collapses, either horizontally or vertically, to reduce the amount of space consumed by the frame, as it is often possible to stack the animal beds, one inside each other, thereby reducing storage and transportation space requirements.

3 Claims, 11 Drawing Sheets

COLLAPSIBLE CONTAINMENT SYSTEM

BACKGROUND OF THE INVENTION

There are many instances in which a containment system is utilized for certain periods of time, then goes unused for other periods of time. For example, snake or reptile beds typically have plastic drawers in which snakes or reptiles are hatched, grown, or showcased. Such plastic drawers are therefore needed in large quantities during the hatching, growth, feeding and marketing, but not needed when such activities wane due to the animals being sold or specific times of the year when such animals are not reproducing. The plastic drawers are typically supported in large frames that hold many tens of such plastic drawers. During periods when the snake or reptile beds are not in use, the plastic drawers are able to stack within each other, but the large frames remain and require space for storage. Furthermore, transportation of these large frames are difficult when there are animals, and equally difficult when there are no animals present.

In the past, when not in use, these snake or reptile beds consume large amounts of space. Likewise, during transportation, the prior snake or reptile beds were difficult to manage due to their overall size.

What is needed is a system that will contain animals (or other items) during periods in which such storage is needed and collapse, utilizing less space when not in use.

SUMMARY OF THE INVENTION

The animal containment system includes a frame and a set of animal beds (e.g., plastic bins or similar) that are held in the frame for growing, mating, demonstration, sales, etc. When the animals are no longer present, the frame collapses, either horizontally or vertically, to reduce the amount of space consumed by the frame, as it is often possible to stack the animal beds, one inside each other, thereby reducing storage and transportation space requirements.

In one embodiment, a system is disclosed including an xxx.

In another embodiment, a method of xxx is disclosed including xxx.

In another embodiment, an apparatus for XXX is disclosed including xxx.

BRIEF DESCRIPTION OF DRAWINGS

The invention can be best understood by those having ordinary skill in the art by reference to the following detailed description when considered in conjunction with the accompanying drawings in which.

DETAILED DESCRIPTION OF THE INVENTION

Figure 1:
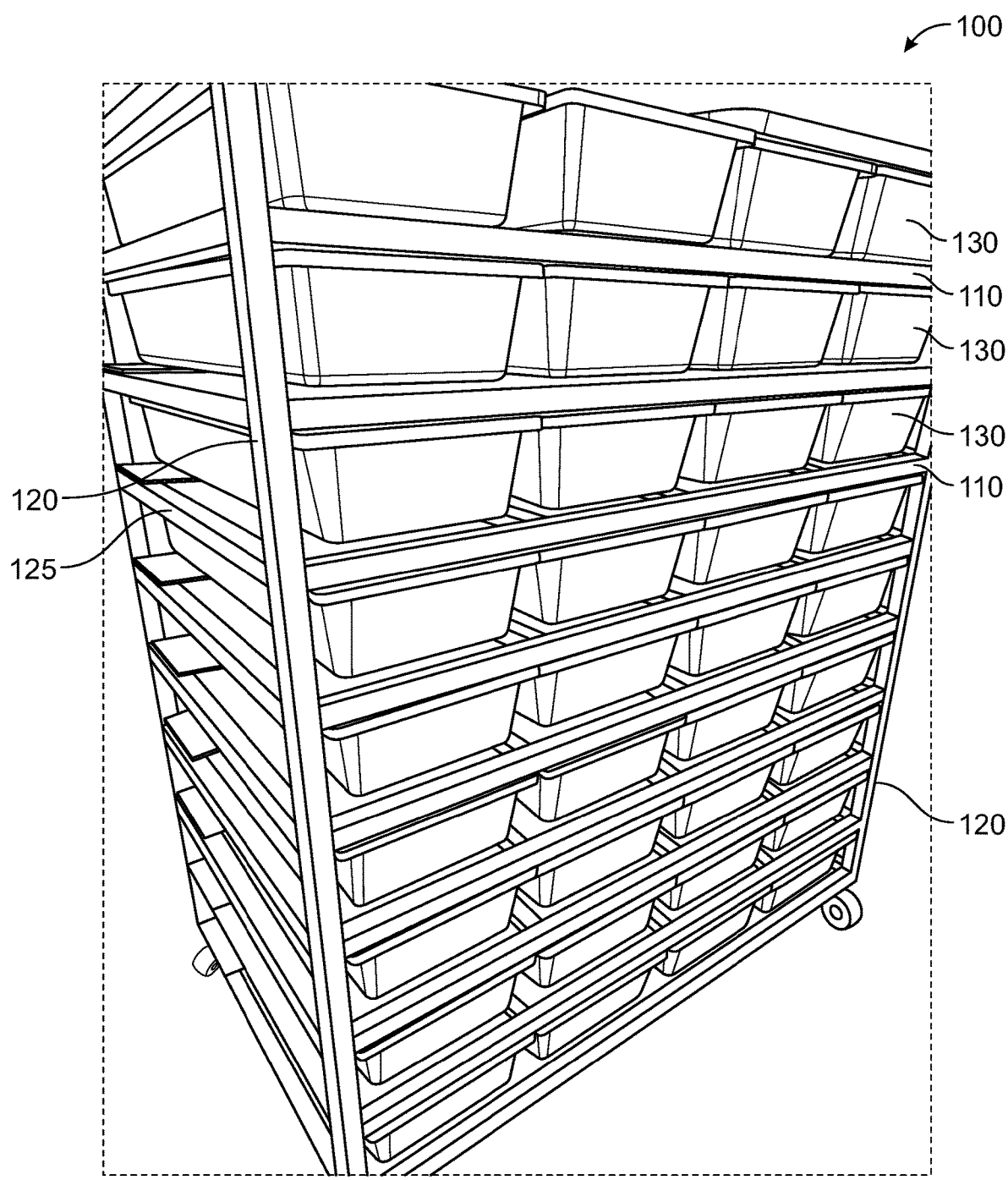
FIG. 1 illustrates a perspective view of a series of animal beds in a fixed frame of the prior art.
Figure 2:
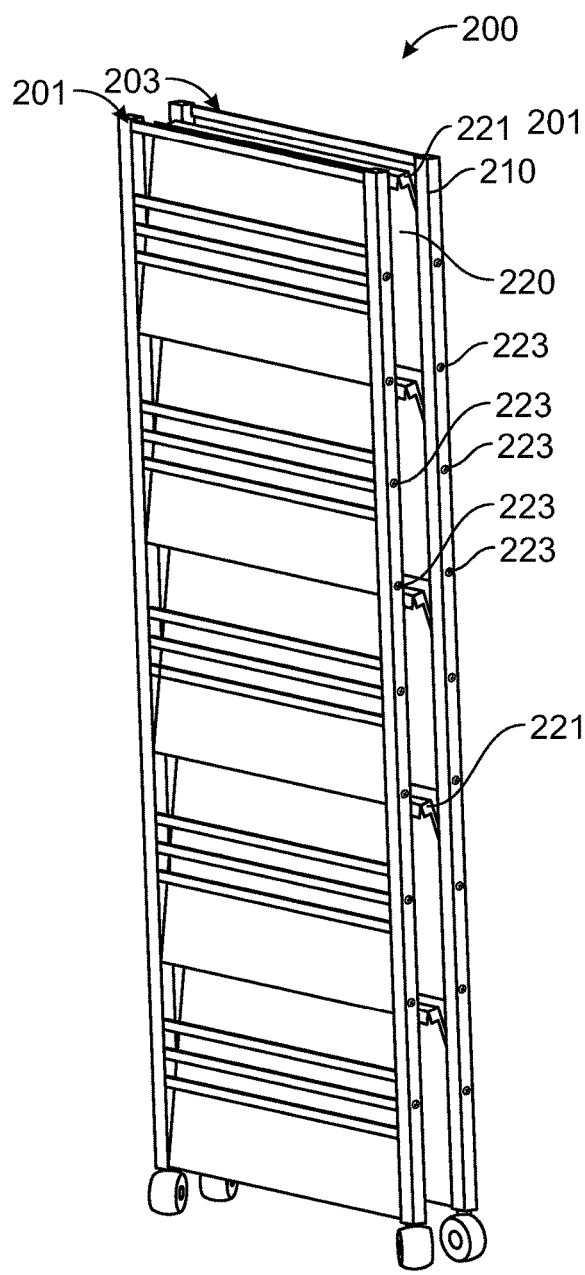
FIG. 2 illustrates a perspective view of a horizontally collapsible frame for holding animal beds in the collapsed configuration.
Figure 3:
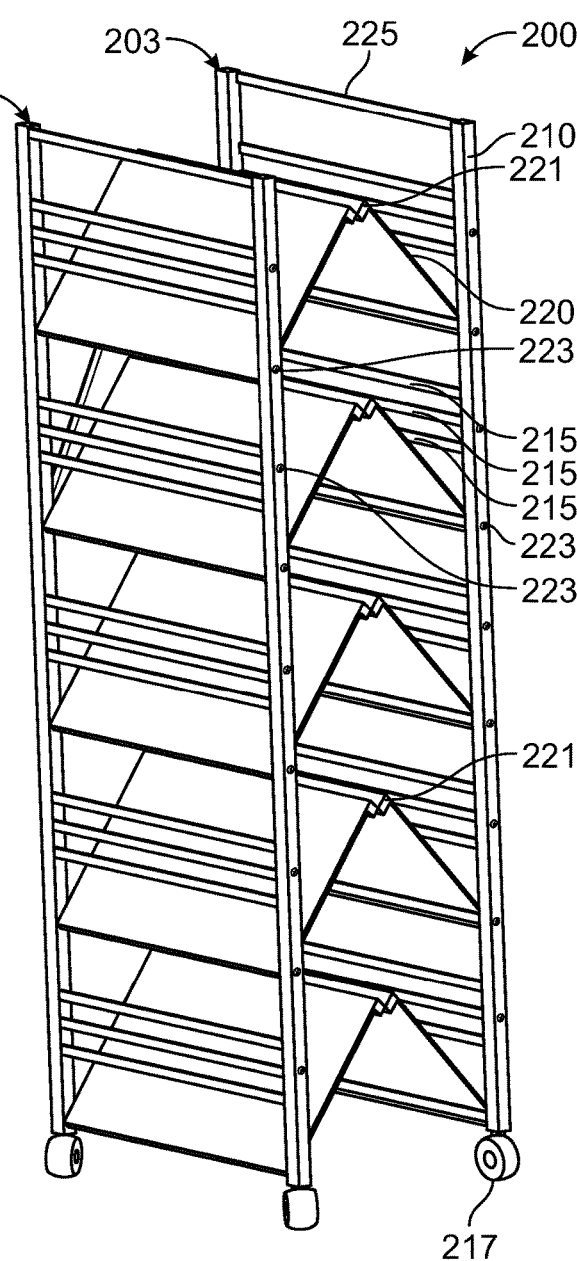
FIG. 3 illustrates a perspective view of the horizontally collapsible frame for holding animal beds in a partially deployed configuration.

Reference will now be made in detail to the presently preferred embodiments of the invention, examples of which are illustrated in the accompanying drawings. Throughout the following detailed description, the same reference numerals refer to the same elements in all figures.

Referring to FIG. 1, a perspective view of a series of animal beds 130 in a fixed frame 100 of the prior art is shown. The fixed frame 100 of the prior art has vertical risers 120, horizontal side supports 125, and horizontal frame members 110 for holding several animal beds 130, which are typically plastic containers. As the vertical risers 120, horizontal side supports 125, and horizontal frame members 110 are fixed to each other, typically by welding, when the animals are not present and the animal beds 130 are removed from the fixed frame 100, the fixed frame 100 remains erect and consumes approximately the same amount of space as before when the animal beds 130 were present. Although, based upon the design of the animal beds 130, many can be stacked within each other taking less space, the fixed frame 100 maintains its original outline and consumes its original space. For many situations, there are times when the animal beds 130 are unoccupied (e.g., the animals have been sold or grown or not in season for reproduction) and it would be advantageous to not have the fixed frame 100 taking up space. Further, it is difficult to transport the fixed frame 100 due to the overall size of the fixed frame 100, often requiring a large truck.

Referring to FIGS. 2 through 6, view of a horizontally collapsible frame 200 for holding animal beds 290. The horizontally collapsible frame 200 is shown in the collapsed configuration in FIG. 2, in a partially deployed configuration in FIG. 3, in a fully deployed configuration in FIG. 4, in a fully deployed configuration ready to accept bins for holding animals in FIG. 5, and in a fully deployed configuration accepting bins for holding animals in FIG. 6.

Figure 6:
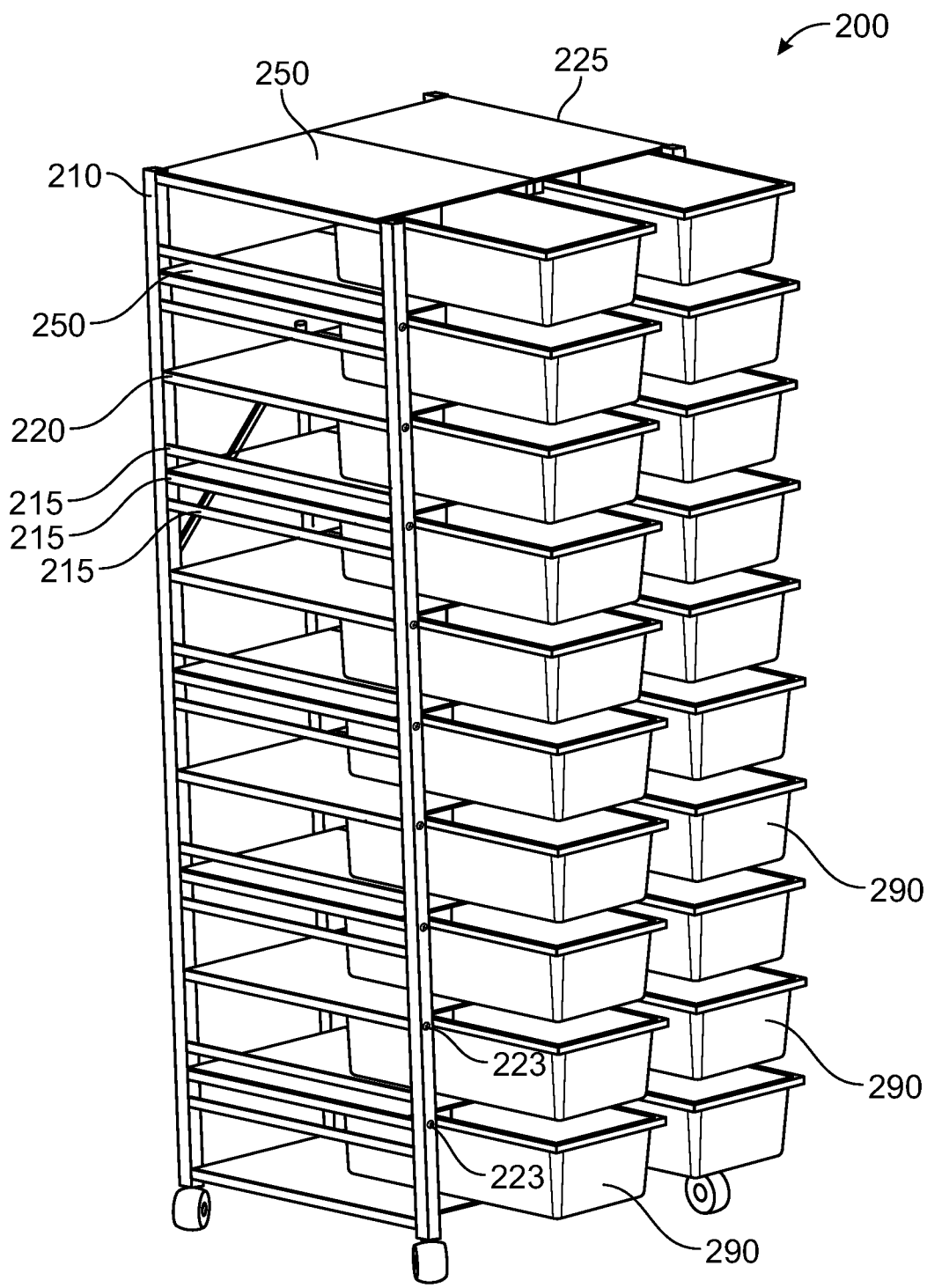
FIG. 6 illustrates a perspective view of the horizontally collapsible frame for holding animal beds in a fully deployed configuration accepting bins for holding animals.
Figure 7:
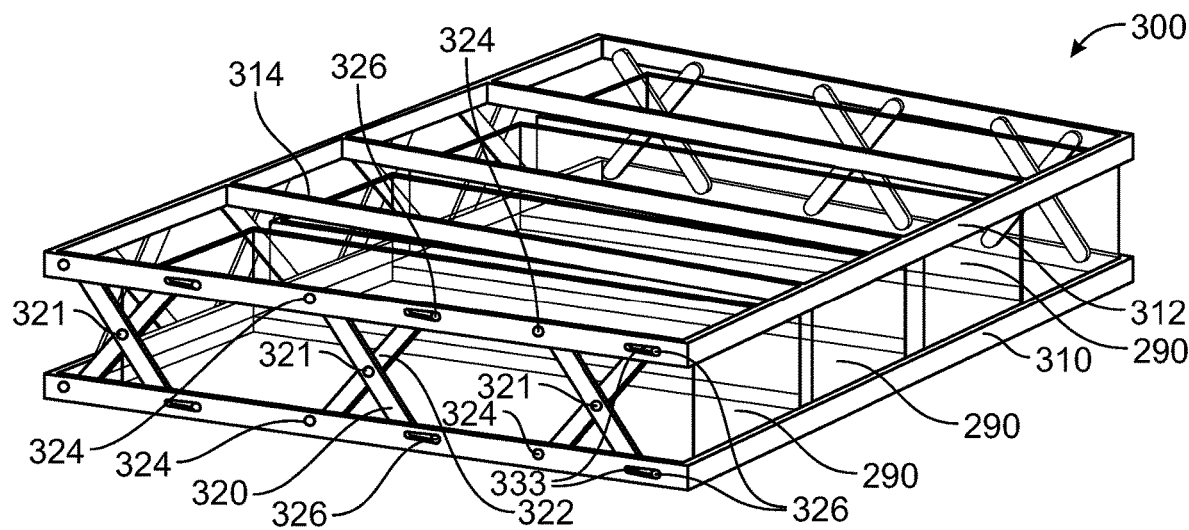
FIG. 7 illustrates a perspective view of one level of a vertically collapsible frame for holding animal beds in a fully deployed configuration with bins.
Figure 8:
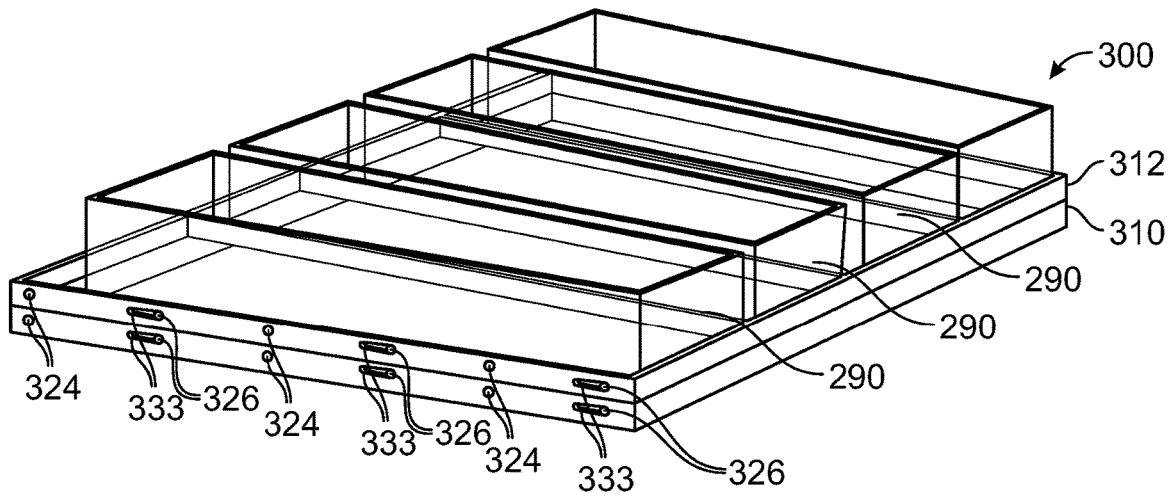
FIG. 8 illustrates a perspective view of one level of a vertically collapsible frame for holding animal beds in a collapsed configuration with bins.
Figure 9:
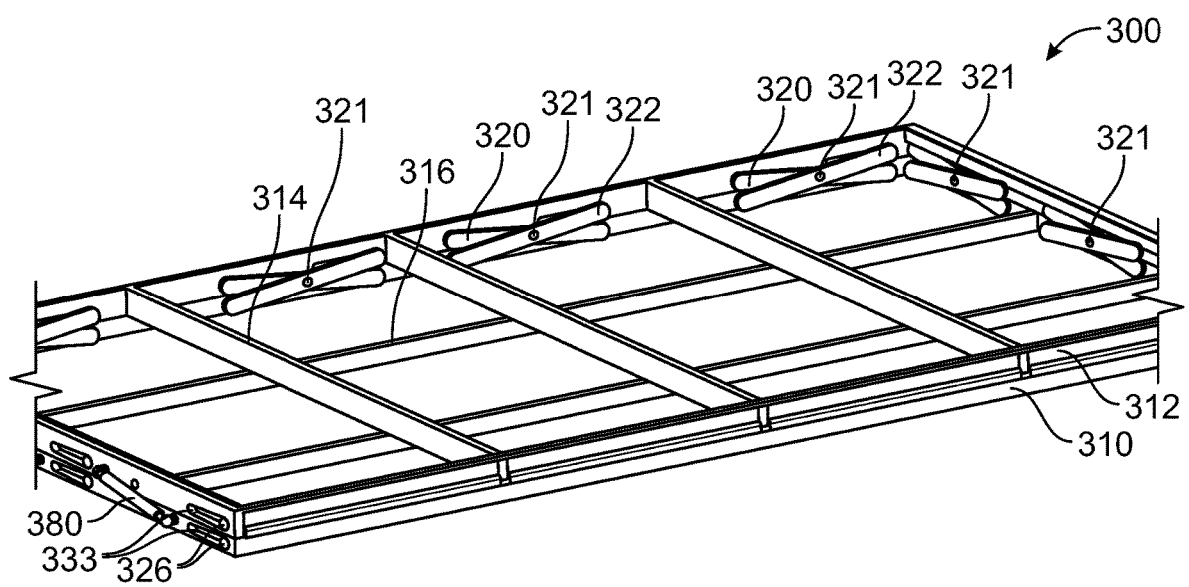
FIG. 9 illustrates a perspective view of one level of a vertically collapsible frame for holding animal beds in a collapsed configuration without bins.
Figure 10:
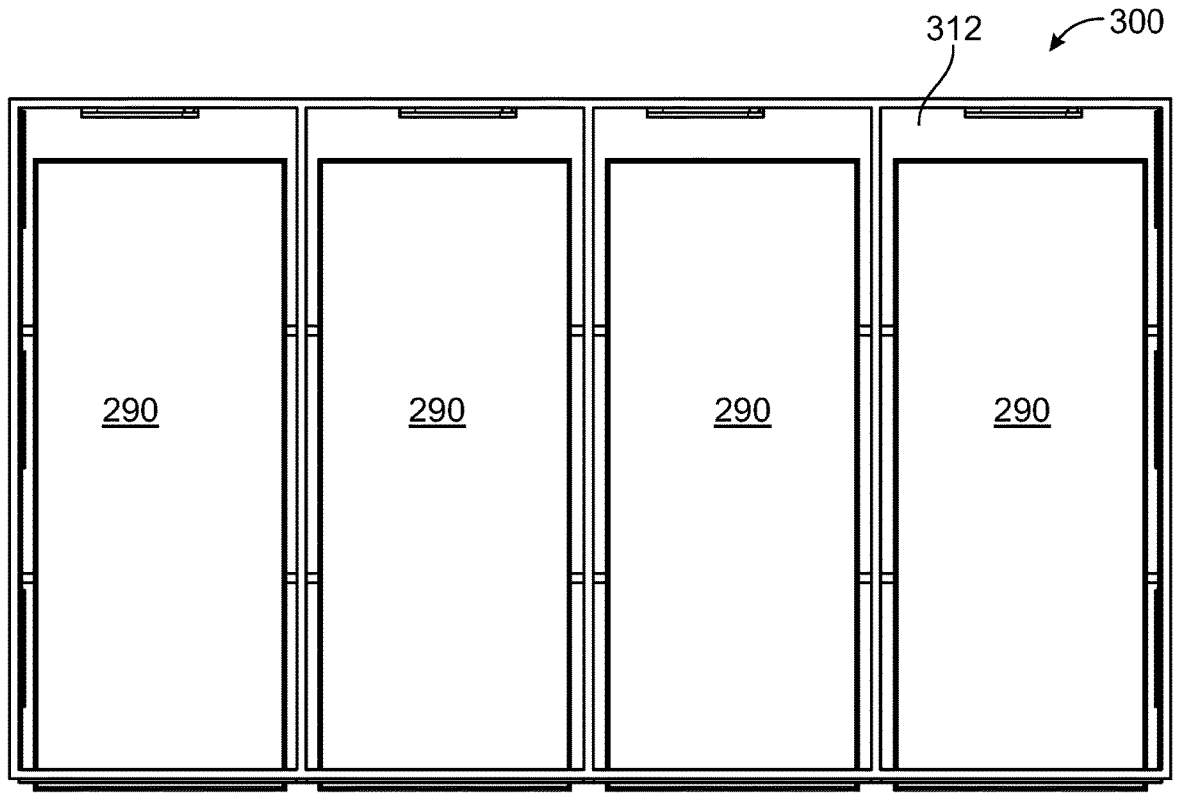
FIG. 10 illustrates a top plan view of one level of a vertically collapsible frame for holding animal beds.
Figure 11:
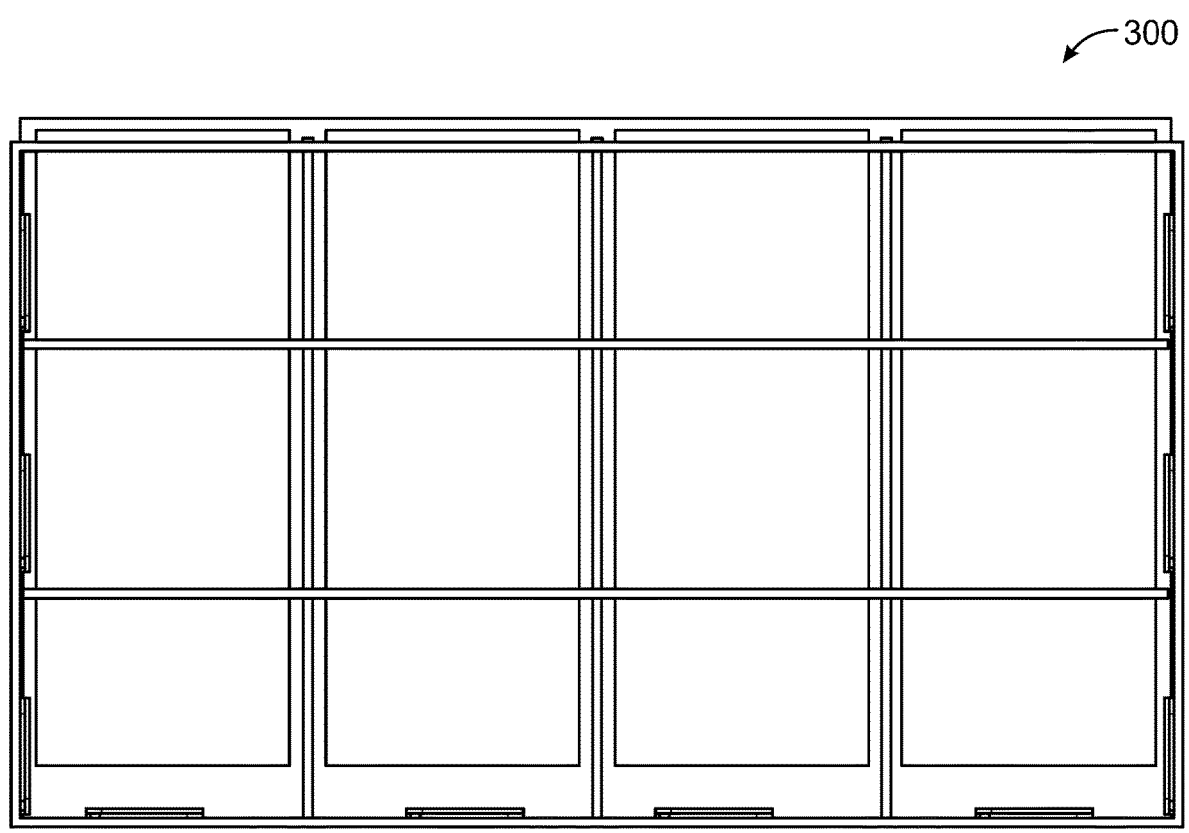
FIG. 11 illustrates a bottom plan view of one level of a vertically collapsible frame for holding animal beds.

The horizontally collapsible frame 200 has two side panels 201/203. Each side panel 201/203 includes vertical members 210 that, in some embodiments interface to a floor by wheels 217. The vertical members 210 are held substantially parallel to each other by cross members 215 a. As shown in FIG. 6, optionally, some of the cross members 215 are configured to support extra shelves that are added when using animal beds 290 that are smaller.

Between the two side panels 201/203 are hingedly or rotatably mounted shelves 220. Each of the shelves 220 is rotatably interfaced at each end to one of the side panels 201/203 by a pin 223 or other rotatable interface, in some embodiments, within a cross member 215. Each of the shelves 220 has a centrally located hinge 221 (or living hinge) that both enables each of the shelves 220 to fold onto itself in the collapsed configuration (as in FIG. 2) and to lay flat in the deployed configuration (as in FIG. 4). Note that each hinge 221 have blocking members 225 (see FIGS. 4 and 5) that prevent the hinge 221 from opening further than 180 degrees (e.g., flat).

Figure 5:
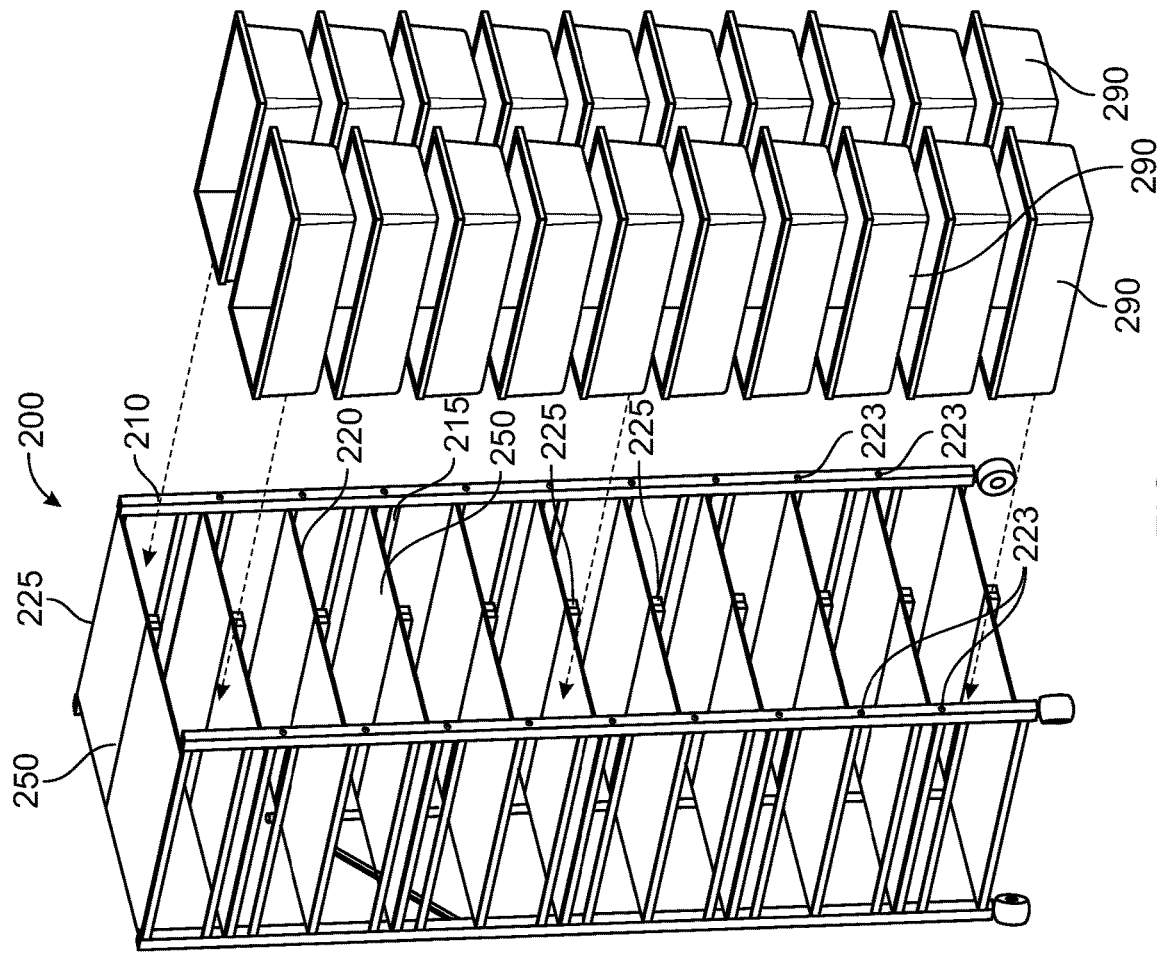
FIG. 5 illustrates a perspective view of the horizontally collapsible frame for holding animal beds in a fully deployed configuration ready to accept bins for holding animals.
Figure 4:
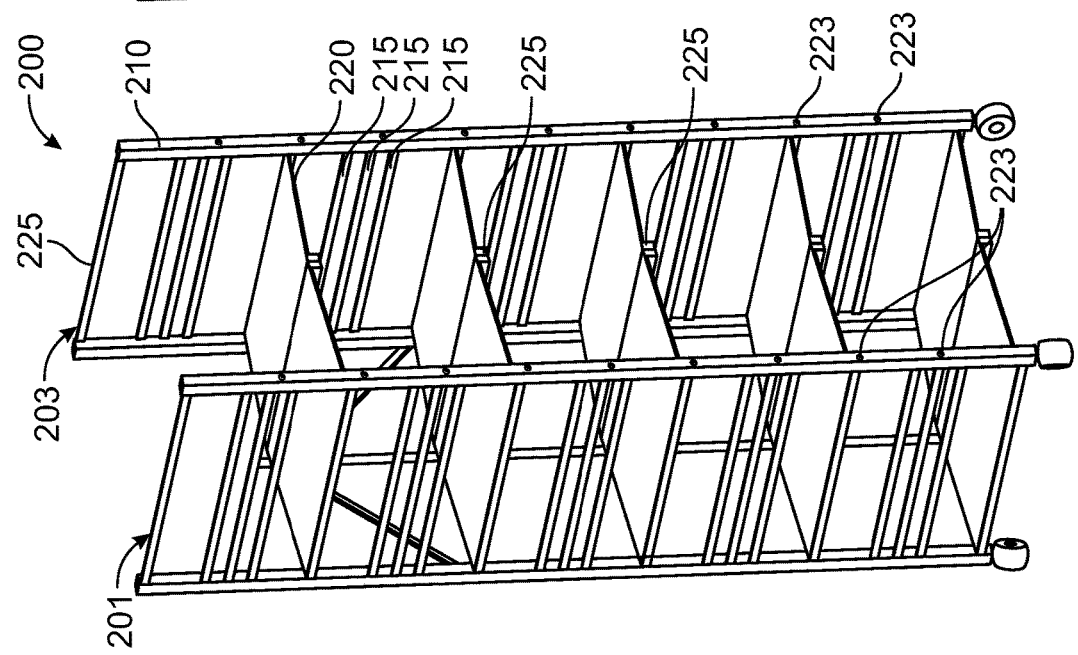
FIG. 4 illustrates a perspective view of the horizontally collapsible frame for holding animal beds in a fully deployed configuration.

In FIG. 4, the horizontally collapsible frame 200 is shown fully deployed and in FIG. 5, the horizontally collapsible frame 200 is shown ready to accept the animal beds 290. In FIG. 6, the horizontally collapsible frame 200 is shown with the animal beds 290 almost fully inserted. When the animal beds 290 are fully inserted, there is little space between the top of each animal bed 290 and the shelf 220 that is above that animal bed 290. In some embodiments, a top shelf 250 of the shelves 220 is provided.

Therefore, assuming the animal beds 290 are designed to stack inside of each other as, for example, buckets do, when there are no animals present, the animal beds 290 are cleaned and stacked inside of each other and the horizontally collapsible frame 200 is collapsed and both occupy significantly less space than the fixed frame 100 of the prior art.

Referring to FIGS. 7 through 11, perspective views of one level of a vertically collapsible frame 300 for holding animal beds 290 are shown. The vertically collapsible frame 300 is shown in a fully deployed configuration with animal beds 290 in FIG. 7 and in a collapsed configuration with animal beds 290 in FIG. 8. The vertically collapsible frame 300 provides a similar feature of saving space when the vertically collapsible frame 300 is not deployed, for example, when animals are no longer present in the animal beds and the animal beds 290 are removed and, for example, stacked inside each other.

The vertically collapsible frame 300 has an upper sub-frame 312 and a lower sub-frame 310, each having generally congruent rectangular shapes. In some embodiments, cross member 314 provide additional structural support.

The upper sub-frame 312 and the lower sub-frame 310 are movably interfaced to each other by several hinges 320/322. Each hinge 320/322 is in the shape of an 'X' and has a pivot 321 connecting one leg 320 of each hinge 320/322 to the other leg 322 of that hinge 320/322. One set of legs 320 of each hinge 320/322 is rotatably interfaced to one of the upper sub-frame 312 by a pin 324 (or any rotatable interface such as a rivet, screw, etc. Another set of legs 322 of each hinge 320/322 is rotatably interfaced or the lower sub-frame 310 by a pin 324 (or any rotatable interface such as a rivet, screw, etc. This allows for rotational movement of the legs of each hinge 320/322 with respect to the upper sub-frame 312 and the lower sub-frame 310. An opposing end of each leg 320/322 of each hinge has a slider pin 326 that moves to a first end of a respective slot 333 when the upper sub-frame 312 and the lower sub-frame 310 are adjacent to each other as in the collapsed configuration as in FIG. 8. The slider pin 326 moves to a second end of the respective slot 333 (opposite the first end) when upper sub-frame 312 and the lower sub-frame 310 are apart from each other in the deployed configuration as in FIG. 7.

In some embodiments, there is a gas tube 380 for enforcing gradual deployment and collapsing of the vertically collapsible frame 300.

In some embodiments, there is an electric heating element 316 located beneath where the animal beds 290 are positioned.

In some embodiments, the second end of the slots 333 are slightly enlarged to capture the slider pins 326 to hold the vertically collapsible frame 300 in either the deployed configuration or the collapsed configuration.

Figure 12:
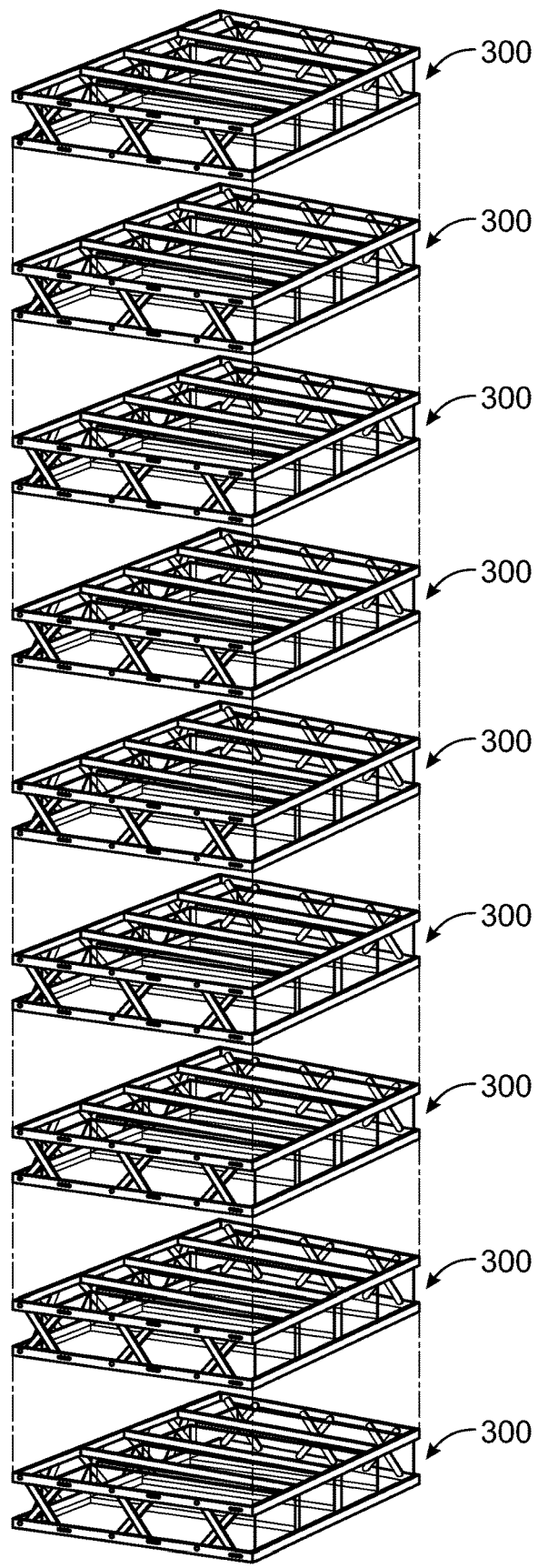
FIG. 12 illustrates a perspective view of several levels of a vertically collapsible frame for holding animal beds in a fully deployed configuration with bins, ready to be stacked.
Figure 13:
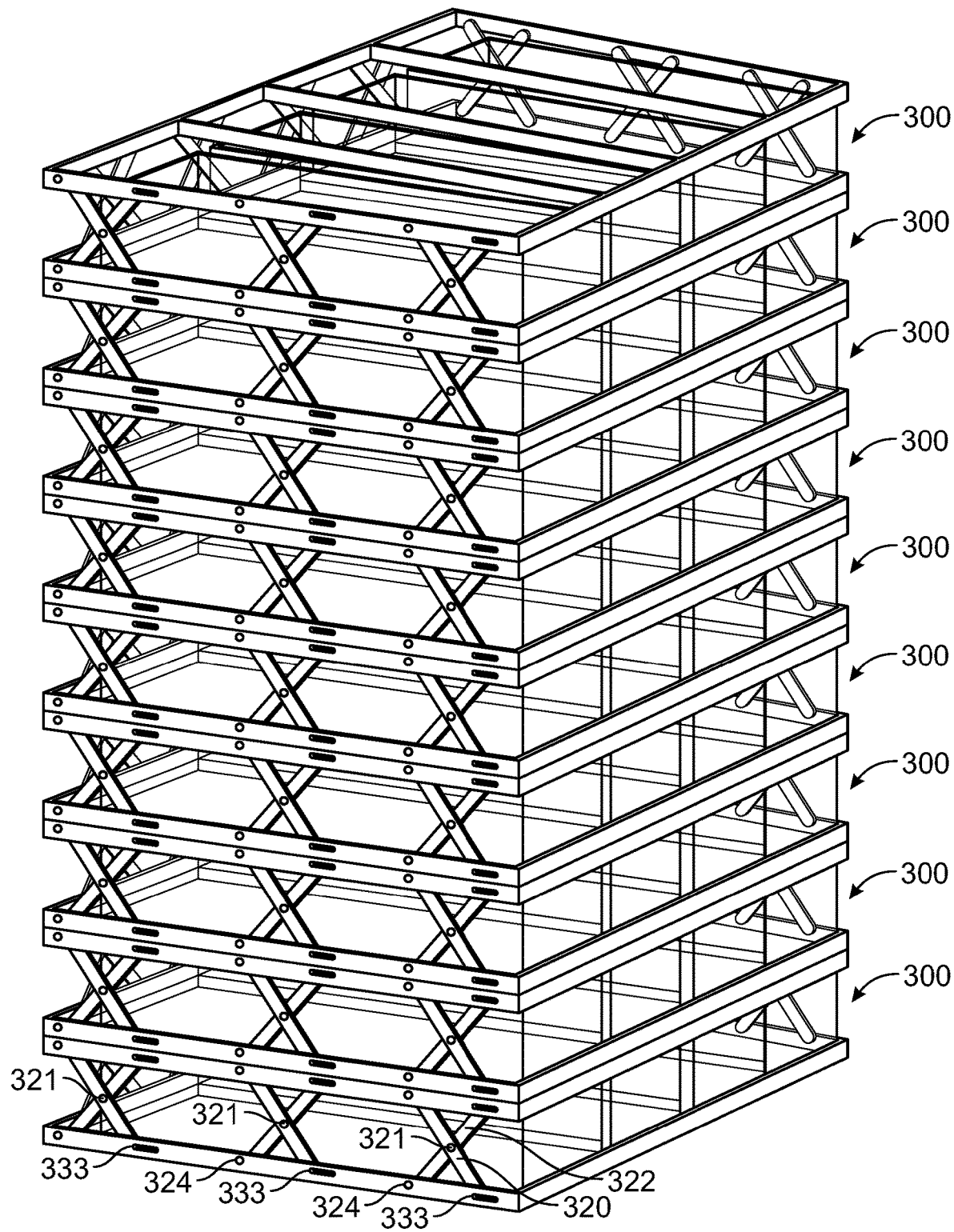
FIG. 13 illustrates a perspective view of several levels of a vertically collapsible frame for holding animal beds in a fully deployed configuration with bins, stacked.

Referring to FIGS. 12 and 13, perspective views of several levels of the vertically collapsible frame 300 for holding animal beds are shown in a fully deployed configuration with bins, ready to be stacked in FIG. 12 and in a fully deployed configuration with bins, stacked in FIG. 13. Note that it is fully anticipated that each level of the vertically collapsible frame 300 be affixed to each successive level of the vertically collapsible frame 300 by any known method, including adhesives, welding, etc. Further, in some embodiments, the lower sub-frame 310 off one level becomes the upper sub-frame 312 of the next successive level.

Figure 14:
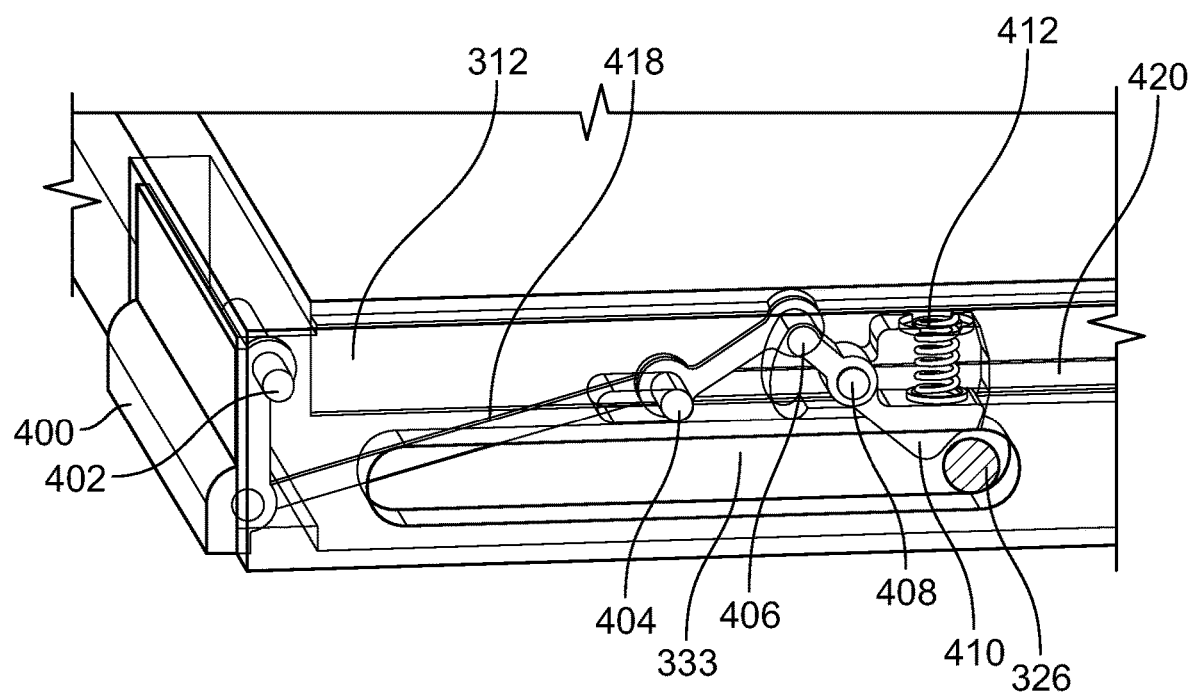
FIG. 14 illustrates a perspective view of a locking mechanism for the vertically collapsible frame for holding animal beds in the fully deployed configuration.
Figure 15:
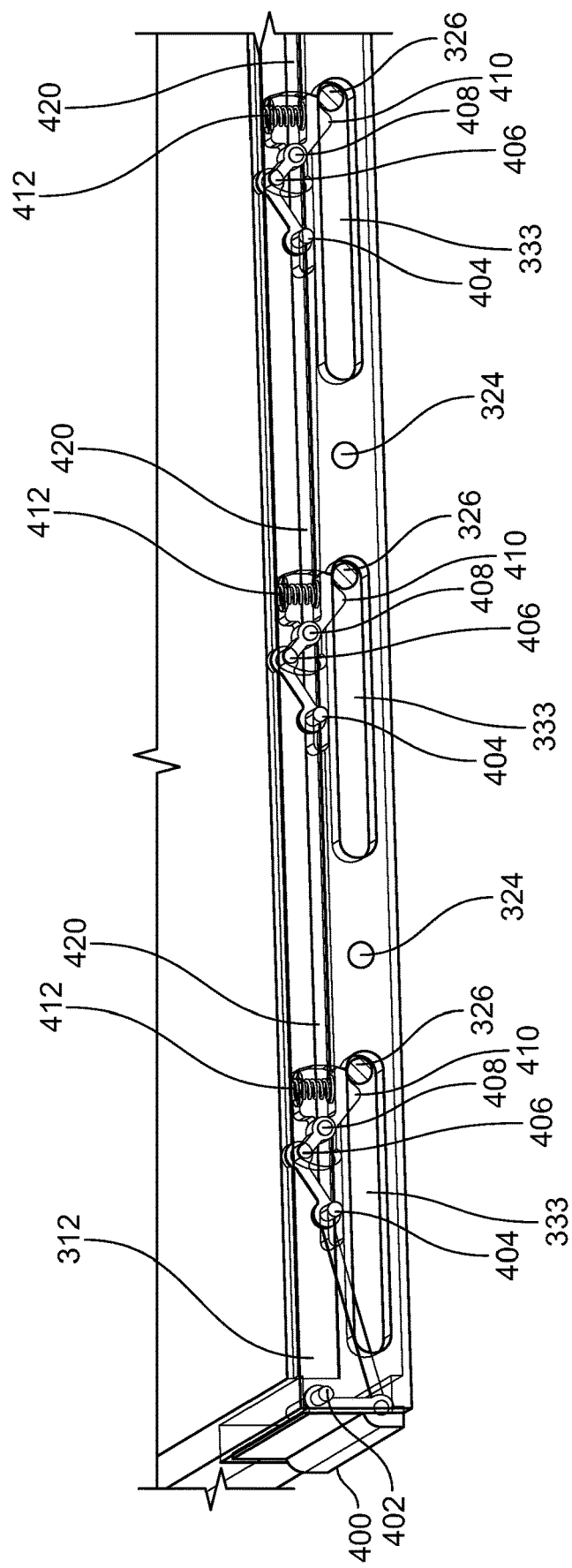
FIG. 15 illustrates a perspective view of the locking mechanism for the vertically collapsible frame for holding animal beds in the fully deployed configuration.

Referring to FIGS. 14 and 15, perspective views of a locking mechanism for the vertically collapsible frame 300 for holding animal beds in the fully deployed configuration. Note that for clarity and brevity reasons, the hinges 320/322 and only the upper sub-frame 312 is shown. The slider pin 326 is shown in the slot 333 in a position in which the vertically collapsible from 300 is deployed (e.g., the hinges 320/322 are extended).

The locking mechanism has a catch 410 that is urged in a position as shown in FIG. 14 in which the catch 410 blocks the slider pin 326 from traversing the slot 333, thereby keeping the vertically collapsible frame 300 from moving towards the collapsed configuration. The catch 410 is urged in this blocking configuration by a spring 412 (e.g., a compression spring).

To release the locking mechanism and move the vertically collapsible frame 300 from the deployed configuration to the collapsed configuration, a pull lever 400 is pulled. The pull lever 400 rotates by way of a hinge pin 402 or living hinge (not shown) and the pull lever 400 is interfaced to a first connecting arm 418 which transmits the pulling motion to a lever pin 404 that is rotatably connected to a pull lever pin 406. The pull lever pin 406, therefore, rotates the catch 410 around a catch axle 408. Therefore, the lever pin 404 is mechanically interfaced to rotate the catch 410 to overcome force of the spring 412 such that, when the pull lever 400 is pulled, the catch 410 rotates around a catch axle 408 to overcome the force of the spring 412 and moves the catch 410 from the blocking configuration, thereby allowing the slider pin 326 to traverse the slot 333 and transition the vertically collapsible frame 300 from the deployed configuration to the collapsed configuration.

In FIG. 15, there are multiple locking mechanisms and the first connecting arm 418 is interfaced to an inter-locking mechanism connecting arm 420 such that, when the pull lever 400 is pulled, the pull lever 400 moves the first connecting arm 418 for unlocking the closest locking mechanisms and the first connecting arm 418 also moves the inter-locking mechanism connecting arm 420 that is interfaced to subsequent locking mechanisms, rotating all catches 410 to overcome the force of the springs 412 and moves the catches 410 from the blocking configuration, thereby allowing the slider pins 326 to traverse the slots 333 and transition the vertically collapsible frame 300 from the deployed configuration to the collapsed configuration.

When the vertically collapsible frame 300 transitions from the collapsed configuration to the deployed configuration, the slider pins 326 travers the slots 333 until they bump up against the catches 410, then with further opening pressure, the slider pins 326 push the catches 410 to overcome the force of the springs 412 until the slider pins 326 pass the catch 410 and the catch 410 is urged back into the position shown, locking the slider pins 326 at the end of the slots 333 until the pull lever 400 is once again operated.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction, and arrangement of the components thereof without departing from the scope and spirit of the invention or without sacrificing all of its material advantages. The form herein before described being merely exemplary and explanatory embodiment thereof. It is the intention of the following claims to encompass and include such changes.

The invention claimed is:

1. A collapsible containment system for animals, the collapsible containment system comprising:
 a collapsible frame that is configured to transition and lock into a deployed configuration and is configured to hold a plurality of animal beds and is configured to release and transition into a collapsed configuration after the plurality of animal beds are removed;
 the collapsible frame comprises an upper horizontal frame and a lower horizontal frame;
 a plurality of hinges, each hinge has a first leg and a second leg, the first leg is rotatably connected to the second leg by a pivot, a first end of the first leg rotatably interfaced to the upper horizontal frame by a second pivot and a first end of the second leg rotatably interfaced to the lower horizontal frame by a third pivot, a second end of the first leg having a first slider pin, the first slider pin movable in a first slot in the lower horizontal frame, a second end of the second leg having a second slider pin, the second slider pin movable in a second slot in the upper horizontal frame whereas, in the deployed configuration the first slider pin is at a first end of the first slot and the second slider pin is at the first end of the second slot and whereas in the collapsed configuration, the first slider pin is at a second, distal end of the first slot and the second slider pin is at the second, distal end of the second slot;
 a spring loaded locking mechanism that has a catch that is spring loaded and the catch is configured to deflect as the first slider pin approaches the first end of the first slot and the catch is configured to extend after the first slider pin is at the first end of the first slot, thereby the catch is configured to lock the first slider pin at the first end of the first slot in the deployed configuration;
 a pull lever, the pull lever configured to deflect the catch and thereby release the first slider pin from the first end of the first slot, thereby the pull lever is configured to release the first slider pin so that the first slider pin is able to move towards the second end of the first slot for the collapsed configuration; and
 when in the deployed configuration, each of the plurality of animal beds is insertable between the lower horizontal frame and the upper horizontal frame;
 wherein when in use, each of the plurality of animal beds is a plastic bin.

2. The collapsible containment system of claim 1, wherein the collapsible containment system is configured to collapse vertically.

3. The collapsible containment system of claim 1, further comprising a gas discharge tube between the upper horizontal frame and the lower horizontal frame.

* * * * *